May 7, 1935. J. A. GRANT 2,000,282
THRESHING AND SCUTCHING MACHINE
Original Filed April 23, 1927 5 Sheets-Sheet 2
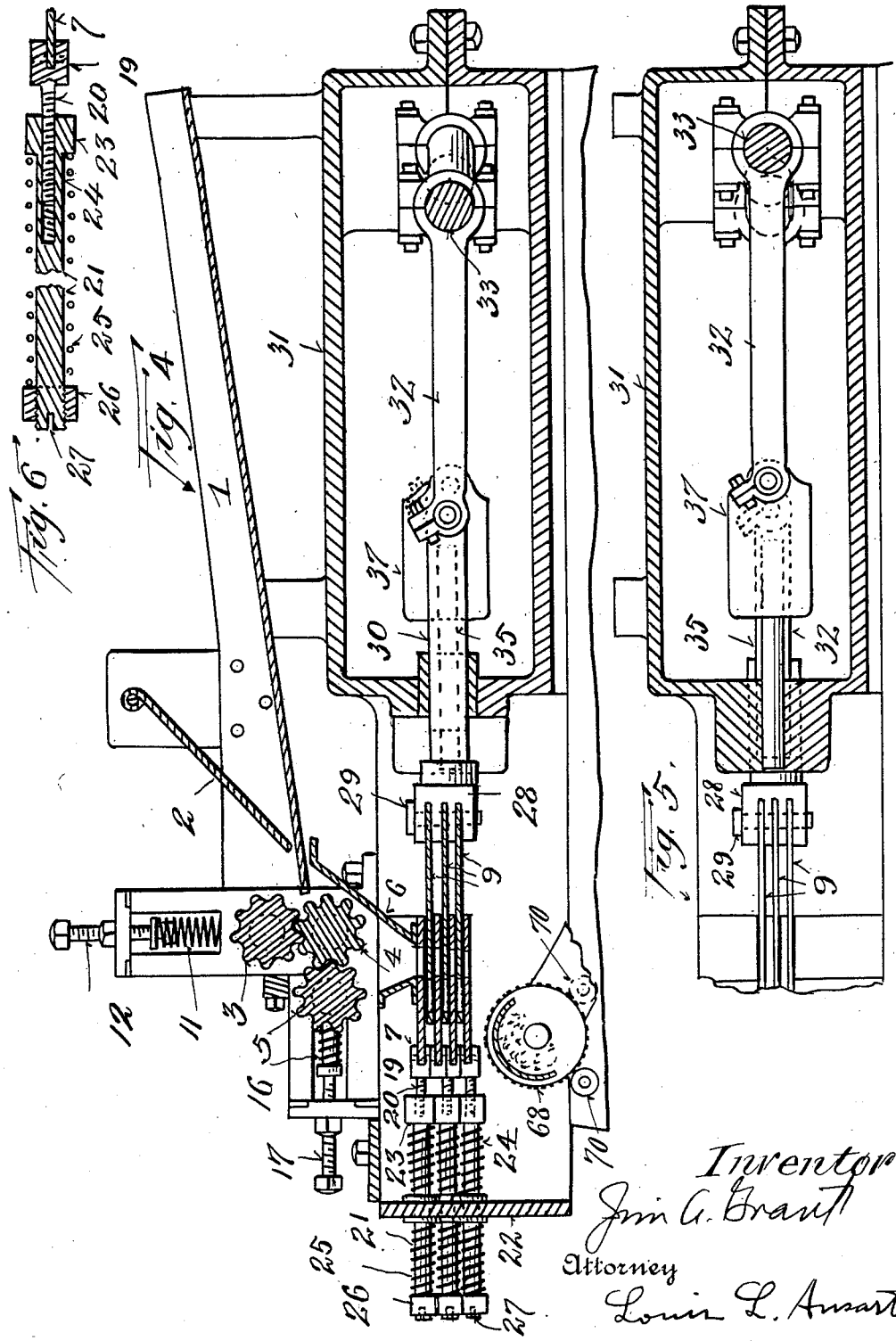

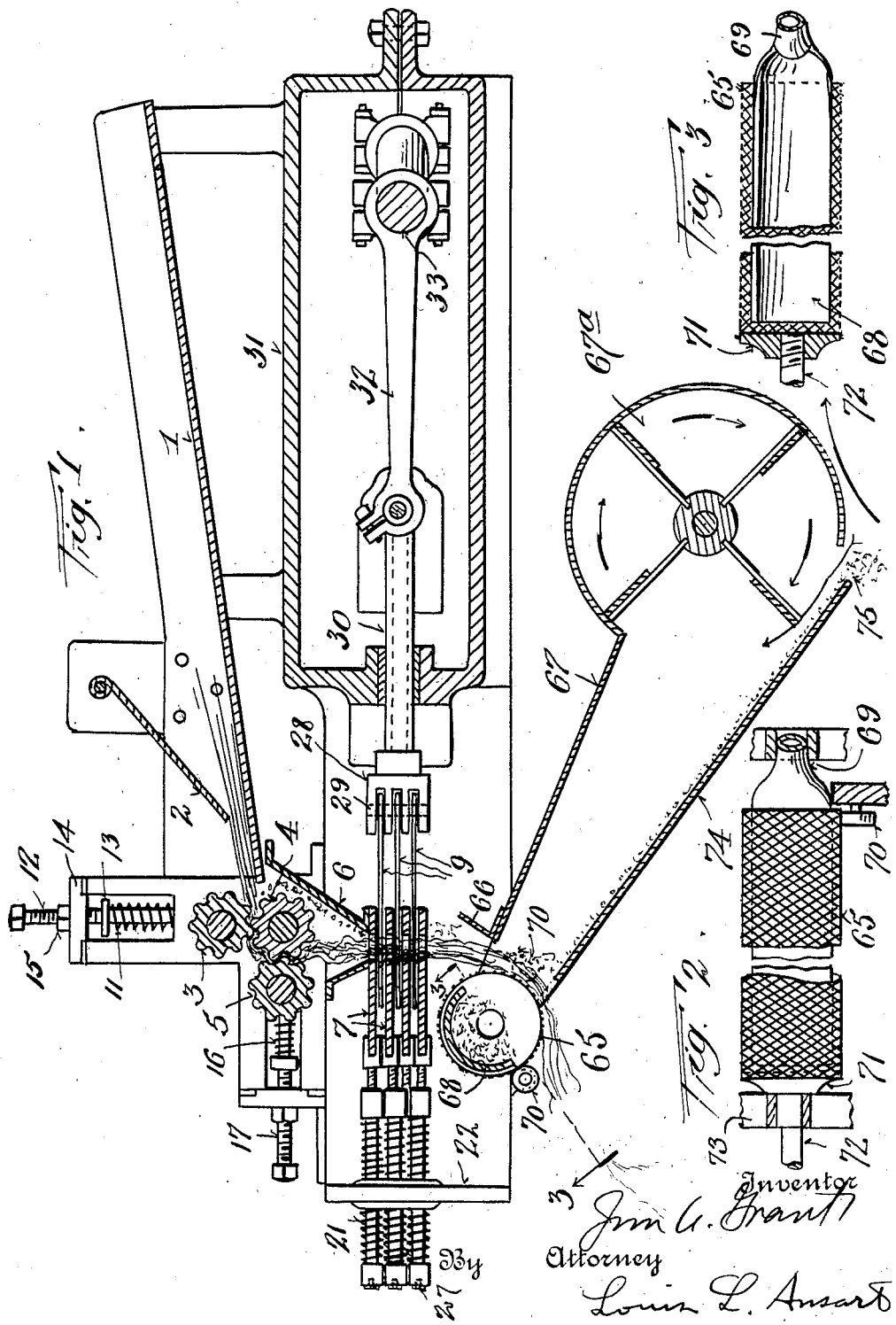

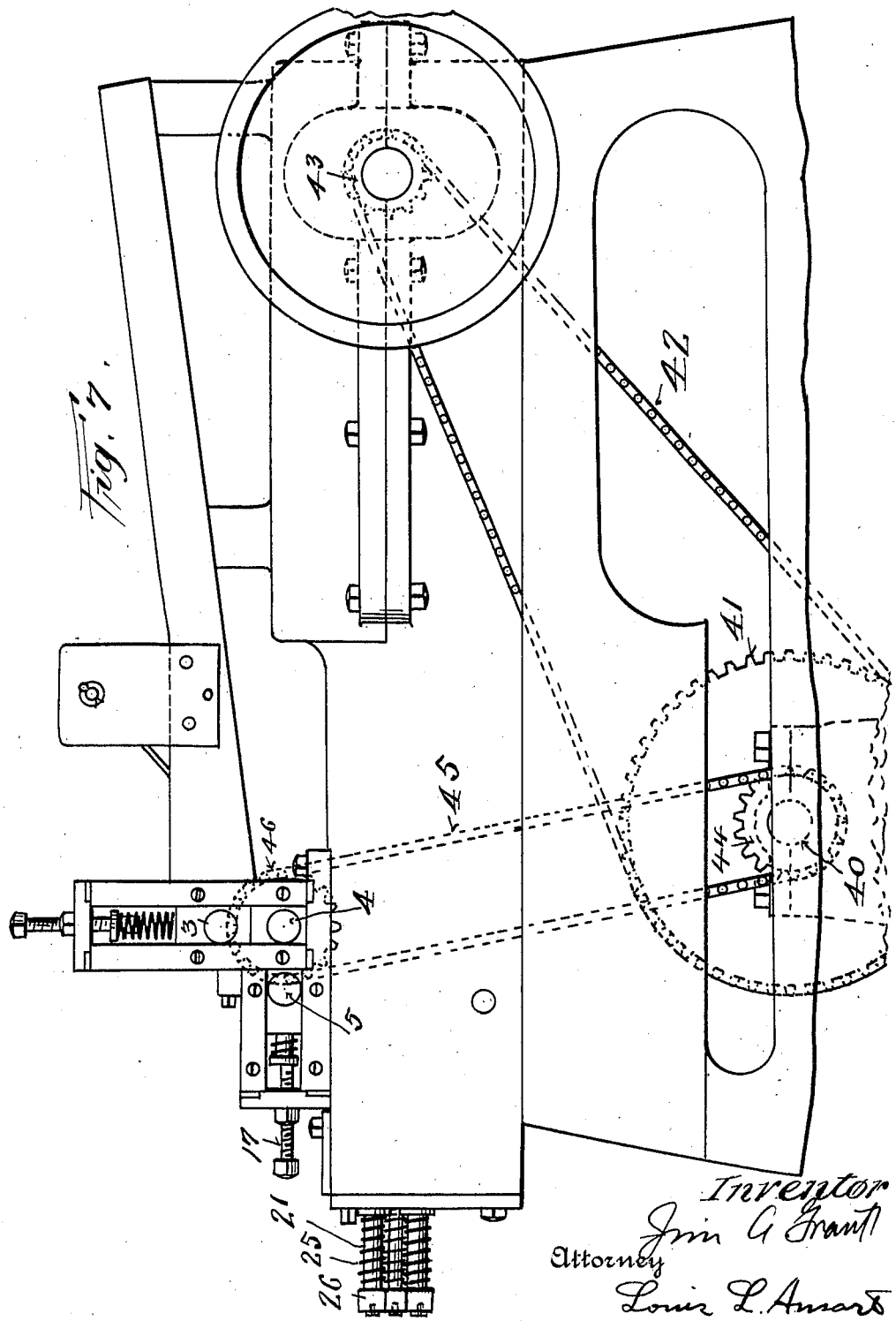

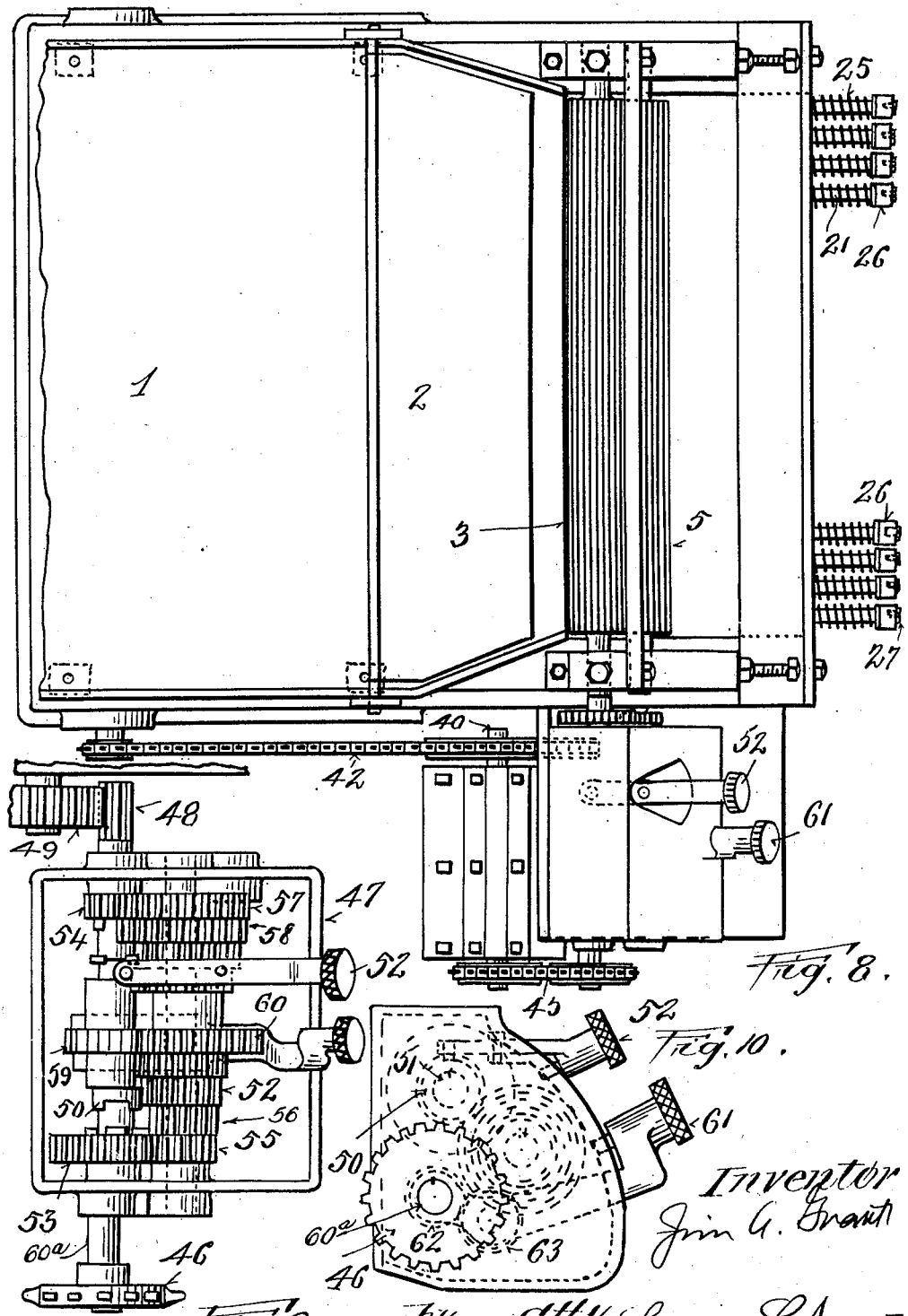

May 7, 1935. J. A. GRANT 2,000,282
THRESHING AND SCUTCHING MACHINE
Original Filed April 23, 1927 5 Sheets-Sheet 5
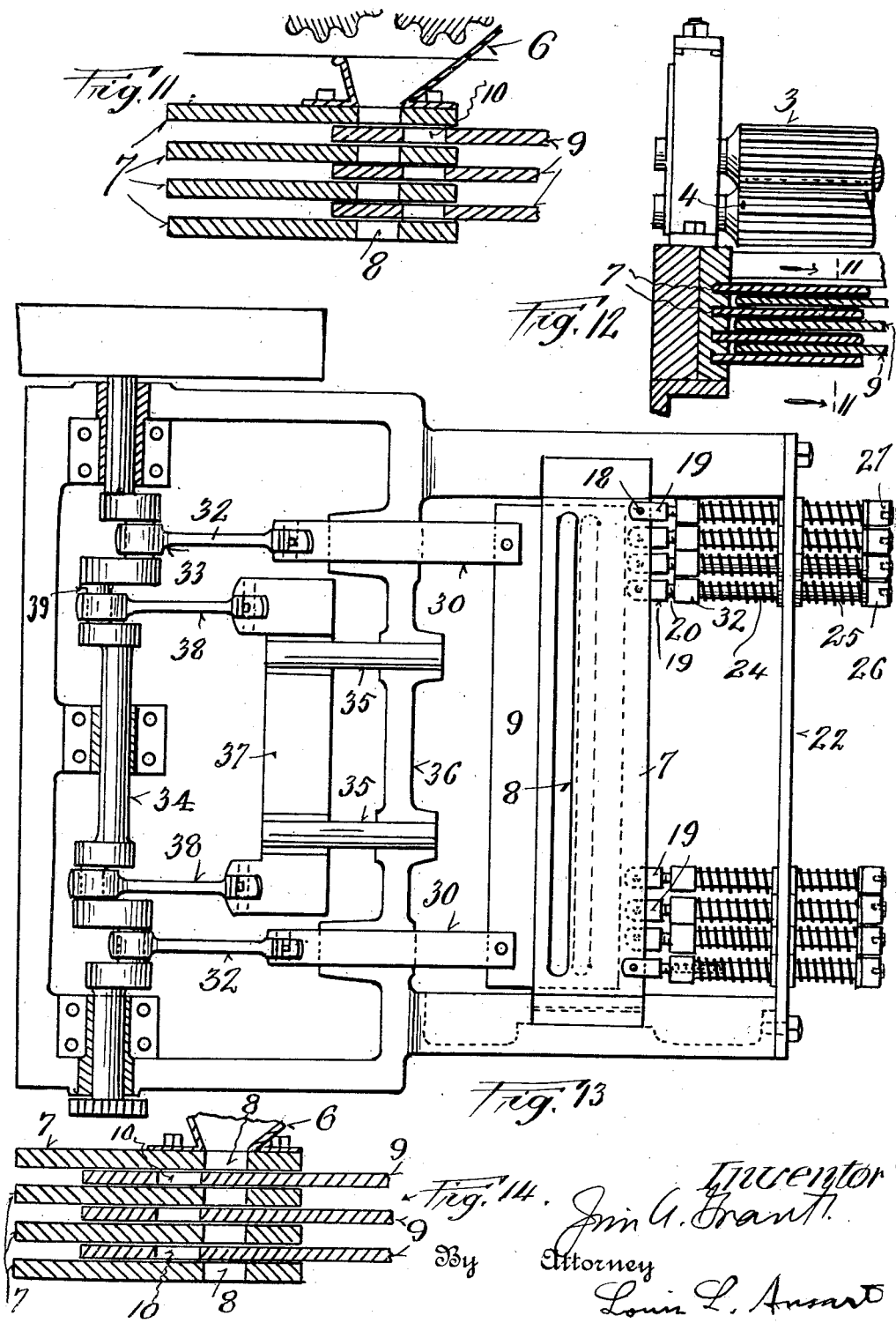

Patented May 7, 1935

2,000,282

UNITED STATES PATENT OFFICE 2,000,282

THRESHING AND SCUTCHING MACHINE

Jim A. Grant, New York, N. Y.

Refiled for application Serial No. 185,975, April 23, 1927. This application August 18, 1930, Serial No. 476,087. Renewed February 16, 1934

12 Claims. (Cl. 19—21)

This invention relates more particularly to fibre cleaning and preparing apparatus designed and adapted for efficiently and economically acting upon fibre producing plants such as flax, ramie, hemp, etc. for the purpose of cleaning the fibre and at the same time obtaining fibre of substantially full length.

Because of the inability of plant decorticating mechanism hitherto devised, to meet the widely varying conditions of the material to be cleaned, which conditions may be due to different degrees of moisture content, atmospheric changes and difference in the retting and in the structure of the plants, etc.—the only mechanism in general use today for such purpose is the old fashioned scutching wheel which has not been changed materially in the last one hundred years. Its continued existence is due to the fact that it gives a regular amount of beating strokes per minute and the actual amount of beating necessary for the material being scutched is regulated and gauged by a skilled operator who, by varying the time during which it is subjected to the scutching operation, can give it more or less working as the condition of the plants may make necessary. The labor required is very severe, considerable skill is required and the output is quite small.

An important object of the present invention is to provide mechanism of wide adaptability to provide for the amount of working required and under easy control of the operator, as by the mere shifting of a handle.

Another important object of the invention is to provide means of the class described, inexpensive to manufacture, easy and economical to operate, and adapted for ready transportation and quick installation in readiness for operation. Other objects of the invention are to provide novel plant treating means adapted for varying the effect of such treatment in accordance with changes in condition of the plants; means for threshing and decorticating fibre producing plants in a single operation; means for threshing and decorticating fibre producing plants and separating the seeds from the waste material in a single operation; means for feeding and decorticating fibre producing plants and for varying the decorticating action in accordance with the widely varying conditions of the material to be cleaned such as may be due to different degrees of moisture content, changes in atmospheric conditions, differences in the retting, differences in the structure of the plant, etc.; novel means for decorticating fibre producing plants by impact of reciprocating parts; means for decorticating fibre producing plants including reciprocating parts and novel and effective means for counterbalancing said reciprocating parts; and means for decorticating such fibre producing plants rapidly and substantially without waste or destruction of fibre.

An important advantage of the decorticating mechanism of the present invention is that it does not whip the fibre and make tow.

Other objects will appear hereinafter upon consideration of the following description and the drawings, in which:

Fig. 1 is a sectional side elevation illustrating one embodiment of the invention;

Fig. 2 is a detail view partly in section showing the rotating screen and the interior deflector;

Fig. 3 is a longitudinal view taken along the line 3—3 of Fig. 1;

Fig. 4 is a view similar to Fig. 1 but illustrating more fully certain details of construction and arrangement of parts;

Fig. 5 is a fragmentary sectional view similar to a part of Fig. 4 but with the section taken at a different position;

Fig. 6 is a detail of the adjustable and elastic supporting means for the stationary blades;

Fig. 7 is a side elevation illustrating driving connections;

Fig. 8 is a top plan view illustrating driving connections and the change speed device;

Fig. 9 is a top plan view of the change speed mechanism with the cover removed;

Fig. 10 is an end view of the change speed mechanism;

Fig. 11 is a sectional view taken along the line 11—11 of Fig. 12;

Fig. 12 is a fragmentary sectional view illustrating the manner in which the stationary blades are supported at the side of the machine.

Fig. 13 is a top plan view of the operating and controlling means for the fixed and movable blades, overlying parts being removed; and Fig. 14 is a view similar to Fig. 11 but with the movable blades in their limiting advanced positions.

In the embodiment of the invention herein disclosed, the plants to be decorticated are placed on an apron 1 and advanced beneath a guard 2 into position to be engaged and advanced by feed rollers 3, 4 and 5 from which the material is directed downwardly through a chute 6 to the decorticating means proper. The said decorticating means may include stationary breaker blades 7 having slots 8 therein and breaker blades 9 reciprocable between the blades 7 and having slots 10 through which the material also passes. Although in the illustrated embodiment of the invention stationary blades 7 and reciprocable blades 9 are shown as slotted, it will be evident that the blade sections on opposite sides of a slot in a blade might be a pair of separated blades with their opposed edges, that is the edges at opposite sides of the slot, spaced apart as required. As will be explained more clearly hereinafter the movement of the blades 9 is so regulated as to have a movement slightly greater than the width of the slots and due to elastic means for supporting the stationary blades, the stalks and fibre are not bent around the edges of the stationary blades and a loosening or decorticating effect is effected by impact. From the decorticating device the material passes to a winnowing device in which the waste material is removed and the seeds, if any, separated from the fibre and saved for an appropriate use.

The guard 2 prevents the operatives from advancing their hands far enough to be engaged by the rollers 3 and 4 which are of corrugated or fluted form. The upper roller 3 is pressed down into engagement by the roller 4 by means of springs 11 at opposite ends thereof, the degree of compression of each of said springs being regulated by a screw 12 having a flange 13 engaging the upper end of the spring 11. The screw 12 is threaded into a stationary member 14 and may be adjusted to give the desired compression and then secured in place by a lock nut 15. In passing between the rollers 3 and 4, the stalks will be bent back and forth and the woody matter broken to a certain extent, loosened from the fibre, the stalks, however, being broken sufficiently as to feed down readily between the fluted feed rollers 4 and 5, the pressure between these rollers being regulated by means of springs 16 and screws 17 as described in connection with the regulation of the pressure of feed roller 3 against feed roller 4. The breaking of the plants in passing through the feed rollers may not be necessary for fibre cleaning but makes it easier to deflect the plants to the slots of the horizontal plates of blades 7 and 9. As indicated in Fig. 1, any loose material carried by the plants as fed to the feed rollers will drop down between the same and the edge of the apron 1 and pass to the decorticating means.

The stationary blades 7 are guided at their edges in slots in the frame so as to be held against vertical movement but so as to permit horizontal movement thereof. Sliding movement of the stationary blades 7 is yieldably resisted by means which will now be described. Each blade 7 is connected at opposite ends thereof by pivots 18 with yokes 19 having threaded shanks 20 which are screwed into the ends of bolts or members 21 slidably mounted in a bar 22 at the adjacent end of the machine. The members 21 are provided at their inner ends with enlarged heads 23 and between these heads and the bar 22 are interposed compression springs 24. Compression springs 25 are mounted on the bolts or members 21 outside of the bar 22 and are held under compression between said bar and washers held in position by nuts 26 threaded on the outer ends of the bolts 21. In this manner, the blades 7 are held in balanced condition and movement of the blades in either direction is resisted by certain of the springs.

Obviously it is important to have the blades 7 in proper alignment. Such alignment may be obtained by inserting the edge of a suitable tool, such as a screw driver, in the slots 27 at the outer ends of the bolts 21 and turning the bolts to shift the yokes 19 to or from the inner ends of the bolts. Adjustment of the springs as to compression may be effected by turning the nuts 26 on the bolts or members 21.

The slotted reciprocating blades 9 are not rigidly mounted but rest on the stationary blades 7 in order that they may automatically find the center of the mass of fibre and thus give equal impact on each side thereof at each edge of the slot. The reciprocable blades project at their rear into slots in yokes or members 28 and are connected with said yokes by means of pins 29. The blades 9 fit loosely in said slots and are movable up and down to some extent. Said yokes 28 are connected with the ends of members 30 slidable in suitable bearings in the adjacent wall of a casing 31 and these members 30 are connected at their other ends by pitmen 32 with cranks 33 of a crank shaft 34, said cranks being so arranged as to give a movement of the plates 9 slightly greater than the width of the slots 8 and 10.

As the material is fed through the slots in the blades 9, it is sharply impacted against the edges of the slots of the stationary plates 7 but is not pressed nor carried and rubbed between the plates. There is no attempt to remove the shives by repeated bendings as in other devices which tend to mat the material together, but at all times the plants or fibre hang freely between the edges of the slots when not actually being impacted against either side. The slots are made wide enough to permit this freedom of action, thus enabling the fibre to shake itself free of the broken off shives. As there are two edges to each lip of the slots each reciprocable movement of the plate in a revolution impacts the material between eight edges. As already brought out, the reciprocating plates are not rigidly mounted on their driving rods but rest on the stationary plates in order that they may automatically find the centre of the mass of fibre and thus give equal impact on each edge of the slot. As is well known, all of the fibre yielding plants taper from root to seed end and there is a constant lessening of bulk from one end to the other. This freedom of action in the reciprocating plates enables contact at all times between the opposing plates, no matter how small the quantity of material passing between them.

Economy of production requires a rate of feeding that demands a speed of reciprocation in the breaking blades corresponding to revolutions of from 1500 to 2000 per minute of the crank shaft 34 and unless the reciprocating parts are arranged to be in almost absolute balance or the machine is made double ended, which would be equivalent to having duplicate reciprocating parts thus balancing each other, it is impossible to operate at near that speed for the vibration would be so great as to make operation of the machine impracticable. After much experimentation the type of balancing arrangement here disclosed has been found most satisfactory and to allow operation at very high speeds without appreciable vibration. As indicated in Fig. 13, studs 35 are rigidly mounted in the forward wall 36 of the casing 31 and project into openings in a heavy slide 37 which is moved back and forth on the studs 35 by means of pitmen 38 connected at their other ends with cranks or crank pins 39 of the crank shaft 34. It will be seen that as the blades 9 are moved in one direction the counterbalance weight 37 is moved in the opposite direction, thus acting to balance the mechanism.

The actuation of the various parts may be effected in different ways but as herein disclosed, power from any source is applied to the drive shaft 40 (Fig. 7) which is connected by means of sprocket wheel 41 thereon and a sprocket chain 42 with a sprocket wheel 43 fixed on the crank 34 which actuates the reciprocating blades of the decorticating device. Power is also transmitted from the drive shaft 40 by means of a sprocket wheel 44 thereon and a sprocket chain 45 to a sprocket wheel 46 of a change speed device indicated in general by 47 and from which motion is transmitted by a gear 48 to a gear 49 on a shaft of the feed roller 4 from which the other feed rollers may be driven. The change speed mechanism, which may be of a known type, includes a clutch member 50 slidably keyed to the shaft 51 of the gear 48 and which may be shifted by the handle 52 to bring the same into connection with the gear 53 or the gear 54 rotatable on said shaft 51 and meshing respectively with a gear portion 55 of a stepped gear-change member 56 and a gear 57 of a stepped gear-change member 58. A driving connection between the gear-change member 56 and the shaft 51 may be effected by a gear 59 on the clutch member 50 and meshing with the section 60 of the gear change member 56. Connection between the shaft 60a and the members 56 and 58 may be effected by a device slidable along the shaft 60a and comprising a handle 61 rotatable on the shaft 60a, a gear 62 slidably keyed on the shaft 60a and controlled as to position therealong by handle 61, and a gear 63 meshing with gear 62 and rotatably supported on handle 61.

By swinging the handle 61 and sliding it along the shaft, the gear 63 may be brought into alignment with and into engagement with any desired section of the members 56 and 58. The change speed device disclosed enables adjustment to many different speeds and small changes in speed to be effected. As a result of this flexibility as to speed, the machine can easily be adjusted to produce the desired results regardless of the aforesaid changes in conditions which tend to affect the operation of the machine on the plants to be decorticated.

As a result of the use of the mechanism just described, the slotted blades or beaters always operate at a regulated speed but the rate at which the material is fed longitudinally through them is controlled by the variable speed device with a wide range of speeds and minute variations so that the operator watching the fibre emerge from the machine can immediately slow up the feed if the material is not sufficiently worked or cleaned or increase the speed if it is getting too much working. Obviously, the operator can, without appreciable effort, operate the mechanism to give it the exact amount of working necessary for perfect cleaning. It can readily be understood that if the speed of the breakers or reciprocating blades is controlled through the variable speed device and the feeding rolls revolve at a uniform speed, the effect would be the same. I prefer to attach the variable speed to the feeding rolls inasmuch as they revolve at a slower speed and therefore there is less wear on the parts. Hitherto the variation of action of fibre cleaning machines has been effected by adjustment of pressure springs on the breaking parts, an arrangement which has proved of some advantage but altogether insufficient to overcome the changing conditions and nature of the materials to be cleaned. The control by the speed changing mechanism on the machine is supplemented by the spring arrangement controlling the stationary blades by which equal amounts of resistance to the forward and backward movements of the stationary plates may be obtained, and this control like the speed of the feed rollers can be adjusted while the machine is in operation. With easy adjustment of the pressure on the breaking plates and perfect control of the feeding speeds, it can be readily understood that the operator has perfect control of the quantity and quality of the working he finds necessary to meet the varying conditions of the straw and the different kinds of fibre yielding plants to be cleaned by the machine.

As the plants and the seeds and bolls pass down through the slots 8 of the blades 7 and the slots 10 of the blades 9, not only are the waste materials or shives separated from the fibre but a threshing action is effected and the seeds are separated from the bolls. The fibre, seeds if any, and waste material may then pass between a rotating sieve 65 of wire mesh and an inclined guide member 66 mounted on the upper wall of an air duct 67 through which air from a blower 67a is directed against the sieve 65 and carries the waste material into the sieve and against a concave baffle 68 therein and at the opposite side thereof. The baffle 68 is connected at one end with a waste tube 69 or duct through which the waste material is forced by the air blast. The sieve 65 is supported at the end adjacent the waste tube 69 on rollers 70 (Figs. 1 and 2) and at its other end is attached to a disc 71 on a shaft 72 rotatable in a support 73 and driven by any suitable means (not shown). The disc 71 prevents the escape in that direction of air and waste from the baffle and the movement thereof in the opposite direction to the waste tube. The sieve or screen 65 is rotated in clockwise direction (Fig. 1) and the fibre passes around the same to a convenient point for removal from the machine. It should be noted that the lower wall 74 of the air duct 67 extends far enough to the left (Fig. 1) to receive the seeds thereon and is so inclined that the seeds will move down the same and out of the casing through an opening 75 at the lower side of the blower and through which air may be drawn.

The operation of the machine is substantially as follows: The plants are placed on the apron (Fig. 1) and advanced beneath the shield 2 to the fluted rollers which advance the plants and break the same sufficiently to cause the forward ends to pass downwardly through chute 6 and into the slots 8 and 10 of the stationary blades 7 and the reciprocating blades 9, respectively. At the same time, bolls and seeds drop down between the roller 4 and the forward edge of the apron 1 into the chute which directs them into the slots in the blades 7 and 9 where the bolls and seeds are separated. In this connection, it should be noted that the chute 6 is mounted on the upper blade 7 and will be vibrated with said blade thus aiding the feed of the bolls and seeds through the chute.

In passing through the blades 7 and 9 the seeds will be separated from the bolls and the waste material or shives separated from the fibre which is shaken back and forth to shake out such waste matter. As the operation continues, the fibre passes down between the member 66 and the screen 65 and is held against the screen 65 by the air blast from the blower 67a and is carried around the lower part thereof. At the same time, the waste is blown through the screen 65 and out through the waste pipe 69 and the seeds drop on the inclined lower or bottom wall 74 of the duct 67 and pass out the opening 75 beneath the blower 67a. The rate of feed of the plants may be varied by the change-speed mechanism to obtain a sufficient but not excessive cleaning action.

I have found that in carrying out my invention, I am able to clean the fibres of fibre-producing plants almost perfectly and at relatively high speed, and that there is substantially no loss of fibre as tow.

It should be understood that various changes may be made in the apparatus and manner of carrying out my invention without departing from the true scope and spirit thereof.

This application is a refile of my application, Serial No. 185,975, filed April 23, 1927.

Having now described my invention, I claim:

1. In a plant decorticating machine, feeding means, means for loosening the seed and waste material from the fibre, means for varying the relative speeds of said feeding means and such loosening means, and means for pneumatically separating the waste material from the fibre and the seed from the waste material substantially simultaneously.

2. In a plant decorticating machine, means for loosening the seed and the waste material from the fibre and pneumatic means for separating the waste material and the seeds as they are removed from said fibre, including a rotary screen, means for blowing the waste material against said screen, and a concave baffle in said screen at the opposite side from said blowing means.

3. In a decorticating machine, two sets of cooperating blades, the blades of each set having slots in register with each other and the blades of the two sets being arranged alternately with each other and with the slots in the two sets in substantial register with each other, means for effecting relative reciprocation of the two sets edgewise of the blades to an extent slightly greater than the width of the slots, and means for yieldably supporting the blades of one set against edgewise movement in either direction so as to avoid bending the fibre around the edges of the slots.

4. In a plant decorticating machine, a series of pairs of breaker blade sections spring-controlled as to edgewise movement and having opposed edges spaced apart to permit the passage of plants therethrough, and a series of loosely mounted pairs of breaker blade sections reciprocable between said spring controlled blade sections.

5. In a plant decorticating machine, cooperating sets of breaker blades, means for effecting a relative reciprocation of said sets of blades, and reciprocatory counterbalancing means for said sets of blades and the means for effecting reciprocation thereof moving in directions opposite to those in which the corresponding reciprocating blades are moving.

6. In a plant decorticating machine, decorticating means including a set of substantially stationary blades with aligned slots therein, a set of movable blades reciprocable between said stationary blades and having slots to cooperate with the slots in the stationary blades, means for yieldably holding said stationary blades against edgewise movement in either direction and for adjusting the alignment thereof, and means for reciprocating said movable blades a distance slightly greater than the width of the slots.

7. In a plant decorticating machine, means including a set of substantially stationary blades having aligned slots defining the path of material fed through the machine, means for yieldably holding said stationary blades against edgewise movement in either direction across said path, a set of reciprocable blades positioned between said stationary blades and having slots substantially in alignment with the slots in said stationary blades to enable the material to pass through the slots of both sets of blades, and controlling means for said reciprocable blades adapted to reciprocate them transversely of the path of the material while permitting each one of them to move laterally toward and from the adjacent stationary blades for self-adjustment to accommodate the material.

8. In a plant decorticating machine, decorticating means including a set of substantially stationary blades with aligned slots therein, a set of movable blades reciprocable between said stationary blades and having slots to cooperate with the slots in the stationary blades, means for reciprocating said movable blades a distance slightly greater than the width of the slots, and adjustable means for yieldably holding said stationary blades against edgewise movement in either direction including bolts projecting through a support and having threaded connections with said blades, each bolt having adjacent its threaded end a stop, a spring between each stop and said support, a spring on said bolt at the outer side of said support, and a nut on the outer end of said bolt to regulate the compression of said springs.

9. In a plant decorticating machine, a set of parallel blades having aligned slots through which the material passes, a second set of blades alternating with the blades of the first set and having aligned slots to receive the material passing through the machine, the blades of the second set being supported so as to be free to move laterally toward and from the blades of the other set for adjustment therebetween, and means for reciprocating one of said sets of blades across the path of said material to cooperate with the blades of the other set in cleaning the material.

10. In a plant decorticating machine, a set of parallel blades having aligned slots through which the material passes, a second set of blades alternating with the blades of the first set and having aligned slots to receive the material passing through the machine, the blades of the second set being supported so as to be free to move laterally toward and from the blades of the other set for adjustment therebetween, means for reciprocating one of said sets of blades across the path of said material to cooperate with the blades of the other set in cleaning the material, means for feeding material to said sets of parallel blades and means for varying the relative speeds of said feeding means and reciprocating blades.

11. In a plant decorticating machine, a series of pairs of breaker blade sections having opposed edges spaced apart to permit the passage of plants therebetween, spring means for supporting said blade sections independently, and a series of pairs of breaker blade sections reciprocable between the first-mentioned pairs of breaker blade sections.

12. In a plant decorticating machine, a series of pairs of breaker blade sections having opposed edges between which plants are passed, means individual to each of said blade sections for resiliently supporting the same, and a series of pairs of breaker blade sections reciprocable between the first-mentioned pairs.

JIM A. GRANT.